US012743769B2

(12) United States Patent
Tsuruda et al.

(10) Patent No.: US 12,743,769 B2
(45) Date of Patent: Sep. 22, 2026

(54) SHAPE CHARACTERISTIC VALUE ESTIMATION APPARATUS, SHAPE CHARACTERISTIC VALUE ESTIMATION METHOD, AND STORAGE MEDIUM

(71) Applicant: Tokyo Electron Limited, Tokyo (JP)

(72) Inventors: Toyohisa Tsuruda, Koshi City (JP); Masato Hosaka, Fuchu City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 286 days.

(21) Appl. No.: 18/680,162

(22) Filed: May 31, 2024

(65) Prior Publication Data

US 2024/0404042 A1 Dec. 5, 2024

(30) Foreign Application Priority Data

Jun. 1, 2023 (JP) ................................ 2023-091050

(51) Int. Cl.
*G06T 7/00* (2017.01)

(52) U.S. Cl.
CPC .... *G06T 7/001* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 11,544,864 | B2 | 1/2023 | Tsuruda et al. | |
| 2020/0073256 | A1* | 3/2020 | Segawa | G03F 7/2022 |
| 2021/0201516 | A1* | 7/2021 | Tsuruda | G06T 7/0004 |
| 2022/0252988 | A1* | 8/2022 | Werkman | G03F 7/70508 |

FOREIGN PATENT DOCUMENTS

JP 2015-215193 A 12/2015

* cited by examiner

*Primary Examiner* — Lennin R Rodriguezgonzalez
(74) *Attorney, Agent, or Firm* — Nath, Goldberg & Meyer; Jerald L. Meyer; Tanya E. Harkins

(57) ABSTRACT

An apparatus includes: an acquisitor for acquiring a processed image including information about a surface of a processed substrate after a process of a target film; an estimator for estimating a shape characteristic value of the target film, by applying, to the processed image, an estimation model associated with a correlation between information about a color of the substrate included in the processed image and the shape characteristic value; a creator for creating an unprocessed-substrate influence model associated with a correlation between a difference between an estimation result of the shape characteristic value by the estimator and a shape characteristic value of the target film acquired without using the estimation model, and information about a color of an unprocessed substrate before the process of the target film, and a corrector for correcting the estimation result of the shape characteristic value based on the unprocessed-substrate influence model.

13 Claims, 12 Drawing Sheets

100
Control device
35
33
36
37
34
32
U3
30
31

100
120
121
Processor
122
Memory
123
Storage
124
Input/output port
U1
Coating unit
U2
Heat treatment unit
U3
Inspection unit

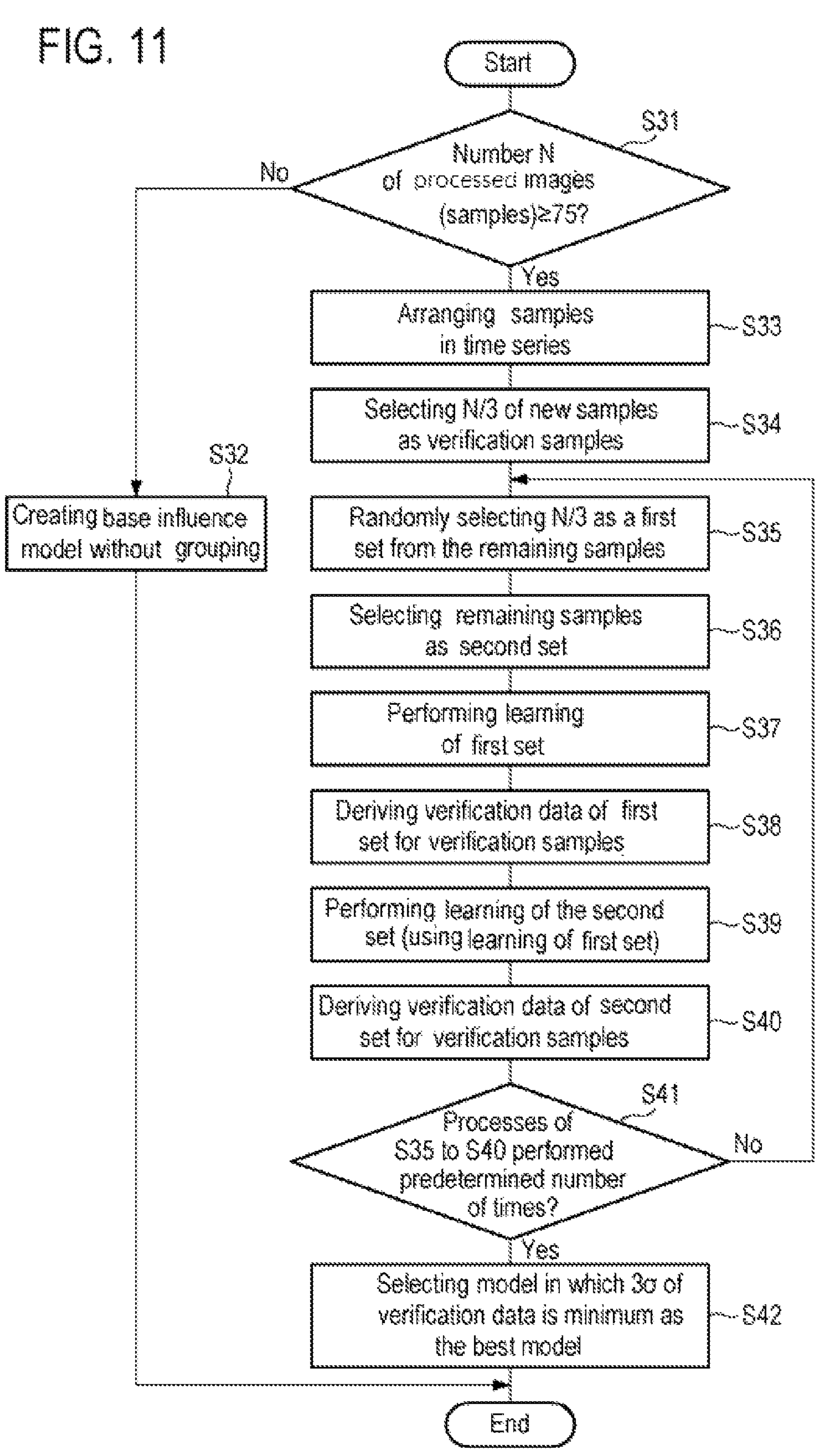
FIG. 11
Start
Number N of processed images (samples)≥75?
S31
No
Yes
Arranging samples in time series
S33
Selecting N/3 of new samples as verification samples
S34
S32
Creating base influence model without grouping
Randomly selecting N/3 as a first set from the remaining samples
S35
Selecting remaining samples as second set
S36
Performing learning of first set
S37
Deriving verification data of first set for verification samples
S38
Performing learning of the second set (using learning of first set)
S39
Deriving verification data of second set for verification samples
S40
S41
Processes of S35 to S40 performed predetermined number of times?
No
Yes
Selecting model in which 3σ of verification data is minimum as the best model
S42
End

SHAPE CHARACTERISTIC VALUE ESTIMATION APPARATUS, SHAPE CHARACTERISTIC VALUE ESTIMATION METHOD, AND STORAGE MEDIUM

CROSS-REFERENCE TO RELATED APPLICATION

This application is based upon and claims the benefit of priority from Japanese Patent Application No. 2023-091050, filed on Jun. 1, 2023, the entire contents of which are incorporated herein by reference.

TECHNICAL FIELD

The present disclosure relates to a shape characteristic value estimation apparatus, a shape characteristic value estimation method, and a non-transitory computer-readable storage medium.

BACKGROUND

Patent Document 1 discloses a configuration in which a film thickness of a film formed on a substrate is calculated from an image obtained by capturing the surface of the substrate. In such a calculation, correlation data associating pixel values obtained from the captured image for preparation with film thickness measurement values at respective coordinates corresponding to the pixel values is used.

PRIOR ART DOCUMENTS

Patent Documents

Patent Document 1: Japanese laid-open publication No. 2015-215193

SUMMARY

According to an aspect of the present disclosure, a shape characteristic value estimation apparatus includes: a processed-image acquisitor configured to acquire a processed image including image information about a surface of a processed substrate after a process of a target film; an estimator configured to estimate a shape characteristic value of the target film, by applying, to the processed image, an estimation model for estimating the shape characteristic value of the target film, the estimation model being associated with a correlation between information about a color of the substrate included in the processed image and the shape characteristic value relating to a shape of the target film formed on the substrate; an unprocessed-substrate influence model creator configured to create an unprocessed-substrate influence model associated with a correlation between a difference between an estimation result of the shape characteristic value of the target film by the estimator and a shape characteristic value of the target film acquired without using the estimation model, and information about a color of an unprocessed substrate before the process of the target film, and an estimation-result corrector configured to correct the estimation result of the shape characteristic value of the target film by the estimator based on the unprocessed-substrate influence model, wherein the unprocessed-substrate influence model creator is configured to execute: an operation of dividing a plural number of the processed image into a first set of processed images and a second set of processed images; an operation of creating a first candidate for the unprocessed-substrate influence model based on the first set of processed images and creating a second candidate for the unprocessed-substrate influence model based on the second set of processed images; and an operation of determining the unprocessed-substrate influence model by comparing a result of correction of the estimation result by the estimation result corrector based on the first candidate with a result of correction of the estimation result by the estimation result corrector based on the second candidate.

BRIEF DESCRIPTION OF DRAWINGS

The accompanying drawings, which are incorporated in and constitute a portion of the specification, illustrate embodiments of the present disclosure, and together with the general description given above and the detailed description of the embodiments given below, serve to explain the principles of the present disclosure.

FIG. 11 is a flowchart for explaining an operation of creating the unprocessed-substrate influence model.

DETAILED DESCRIPTION

Figure 1:
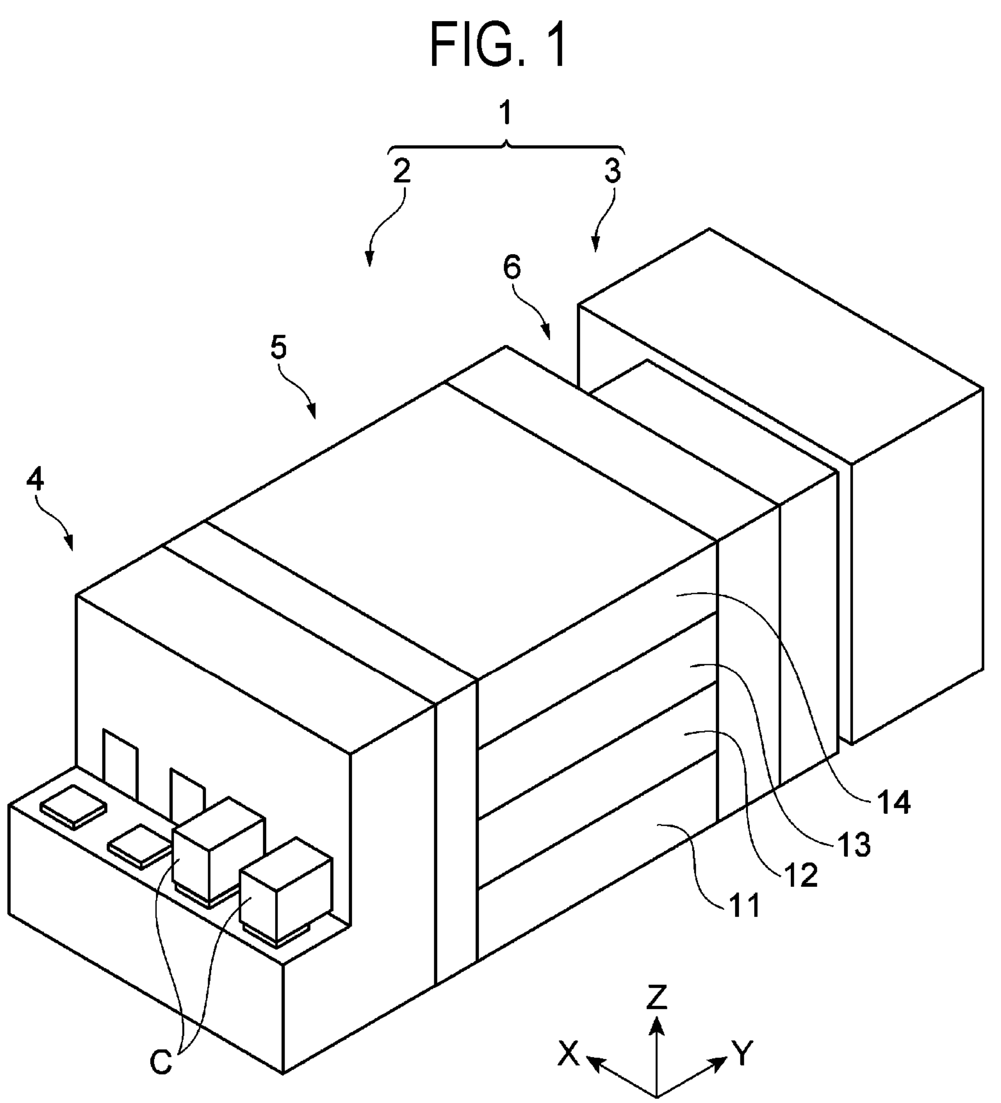
FIG. 1 is a schematic view illustrating an example of a schematic configuration of a substrate processing system.

Various exemplary embodiments will be described below in detail with reference to the drawings. In addition, the same or corresponding parts in each drawing are designated by like reference numerals. In the following detailed description, numerous specific details are set forth in order to provide a thorough understanding of the present disclosure. However, it will be apparent to one of ordinary skill in the art that the present disclosure is practiced without these specific details. In other instances, well-known methods, procedures, systems, and components have not been described in detail so as not to unnecessarily obscure aspects of the various embodiments.

[Substrate Processing System]

A substrate processing system 1 is a system that forms a photosensitive film on a substrate, exposes the photosensitive film, and develops the photosensitive film. The substrate to be processed is, for example, a semiconductor wafer W.

The substrate processing system 1 includes a coating/developing apparatus 2 and an exposure apparatus 3. The exposure apparatus 3 performs an exposure process on a resist film (photosensitive film) coated on the wafer W (substrate). Specifically, the exposure apparatus 3 irradiates an exposure target portion of the resist film with energy rays by a method such as liquid immersion exposure or the like. The coating/developing apparatus 2 performs a process of coating a resist film on the surface of the wafer W (substrate) before the exposure process performed by the exposure apparatus 3, and performs a developing process on the resist film after the exposure process. By performing the series of processes, the resist film having a predetermined pattern is formed.

[Substrate Processing Apparatus]

Figure 2:
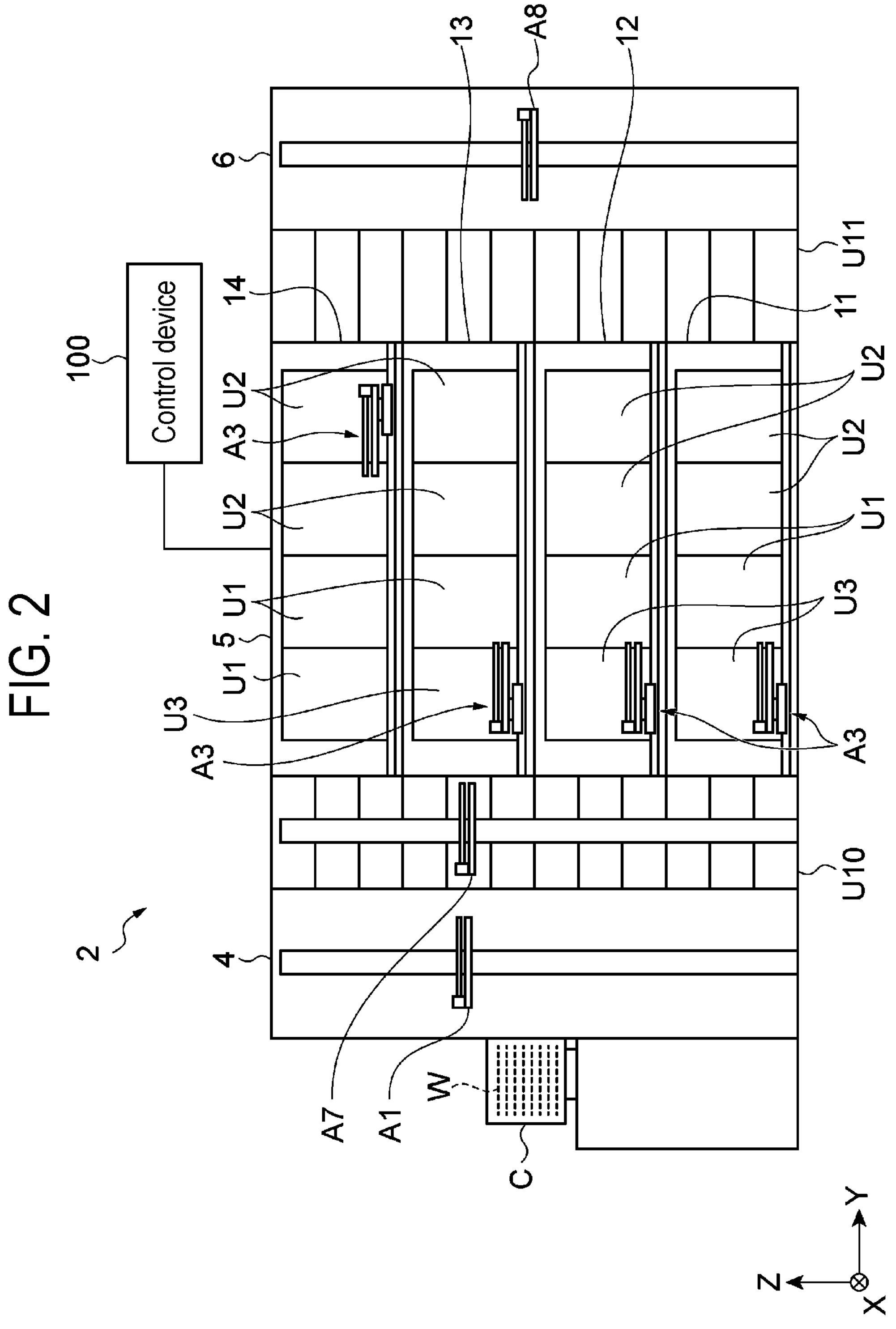
FIG. 2 is a schematic view illustrating an example of a coating/developing apparatus.

Hereinafter, a configuration of the coating/developing apparatus 2 will be described as an example of a substrate processing apparatus. As illustrated in FIGS. 1 and 2, the coating/developing apparatus 2 includes a carrier block 4, a processing block 5, an interface block 6, and a control device 100. The coating/developing apparatus 2 as the substrate processing apparatus described in an embodiment of the present disclosure corresponds to a shape characteristic value estimation apparatus that estimates a shape characteristic value related to a shape of a target film formed on a substrate. The term "shape characteristic value" related to the shape of the target film in the present embodiment represents a feature quantity related to the shape of the target film. As one example, the shape characteristic value may include a critical dimension (CD) such as a line width and a hole diameter of the target film, or a film thickness of the target film. In the following embodiment, a case where the coating/developing apparatus 2 as the shape characteristic value estimation apparatus estimates CD of the target film will be described. A function of estimating CD by the coating/developing apparatus 2 will be described later.

The carrier block 4 loads the wafer W into the coating/developing apparatus 2 and unloads the wafer W from the coating/developing apparatus 2. For example, the carrier block 4 is capable of supporting a plurality of carriers C (accommodation parts) for the wafer W and is provided with a transfer device A1 including a delivery arm built therein. The carrier C accommodates, for example, a plurality of circular wafers W. The transfer device A1 takes out the wafer W from the carrier C and delivers the wafer W to the processing block 5. The transfer device A1 receives the wafer W from the processing block 5 and returns the wafer W into the carrier C. The processing block 5 includes a plurality of processing modules 11, 12, 13 and 14.

The processing module 11 includes a plurality of coating units U1, a plurality of heat treatment units U2, a plurality of inspection units U3, and a transfer device A3 that transfers the wafer W to these units. The processing module 11 forms a lower layer film on the surface of the wafer W using the coating unit U1 and the heat treatment unit U2. For example, the coating unit U1 of the processing module 11 coats a processing liquid for formation of the lower layer film on the wafer W while rotating the wafer W at a predetermined number of rotations. The heat treatment unit U2 of the processing module 11 performs various heat treatments associated with the formation of the lower layer film. The heat treatment unit U2 includes, for example, a heating plate and a cooling plate built therein. The heat treatment unit U2 performs a heat treatment by heating the wafer W with the heating plate to a predetermined heating temperature and cooling the heated wafer W with the cooling plate. The inspection unit U3 performs a process for inspecting the surface state of the wafer W, and acquires, for example, information about a surface image as information indicating the surface state of the wafer W.

The processing module 12 includes a plurality of coating units U1, a plurality of heat treatment units U2, a plurality of inspection units U3, and a transfer device A3 for transferring the wafer W to these units. The processing module 12 forms an intermediate film on the lower layer film by the coating unit U1 and the heat treatment unit U2. The coating unit U1 of the processing module 12 coats a processing liquid for forming the intermediate film onto the lower layer film to form a coating film on the surface of the wafer W. The heat treatment unit U2 of the processing module 12 performs various heat treatments associated with the formation of the intermediate film. The heat treatment unit U2 includes, for example, a heating plate and a cooling plate, and performs heat treatment by heating the wafer W to a predetermined heating temperature by the heating plate and cooling the heated wafer W by the cooling plate. The inspection unit U3 performs a process for inspecting the state of the surface of the wafer W, and acquires, for example, information about a surface image as information indicating the state of the surface of the wafer W.

The processing module 13 includes a plurality of coating units U1, a plurality of heat treatment units U2, a plurality of inspection units U3, and a transfer device A3 for transferring the wafer W to these units. The processing module 13 forms a resist film on the intermediate film by the coating unit U1 and the heat treatment unit U2. The coating unit U1 of the processing module 13 coats a processing liquid for forming the resist film onto the intermediate film, for example, while rotating the wafer W at a predetermined number of rotations. The heat treatment unit U2 of the processing module 13 performs various heat treatments associated with the formation of the resist film. The heat treatment unit U2 of the processing module 13 performs heat treatment (post applied bake: PAB) on the wafer W on which the coating film is formed at a predetermined heating temperature to form the resist film. The inspection unit U3 performs a process for inspecting the state of the surface of the wafer W and acquires, for example, information about a surface image as information indicating the state of the surface of the wafer W.

The processing module 14 includes a plurality of developing units, a plurality of heat treatment units U2, a plurality of inspection units U3, and a transfer device A3 that transfers the wafer W to these units. The processing module 14 performs a developing process on an exposed resist film R using the developing unit and the heat treatment unit U2. The developing unit of the processing module 14 performs a developing process on the resist film R by supplying a developing solution onto the exposed surface of the wafer W while rotating the wafer W at a predetermined rotational speed, and then rinsing the developing solution with a rinsing solution. Such a developing process is a process relating to the resist film R (target film), and specifically, a process of removing a portion of the resist film R. The heat treatment unit U2 of the processing module 14 performs various heat treatments associated with the developing process. Specific examples of the heat treatments may include a heat treatment before developing process (PEB: Post-Exposure Bake), a heat treatment after developing process (PB: Post Bake), and the like. The inspection unit U3 performs a process of inspecting a state of the surface of the wafer W, and acquires, for example, a surface image as information indicating the state of the surface of the wafer W. Such a surface image is a processed image that includes image information about the surface of the wafer W after the developing process, which is a process relating to the resist film R (target film).

A shelf unit U10 is provided in the processing block 5 on the side of the carrier block 4. The shelf unit U10 is divided into a plurality of cells arranged in a vertical direction. A transfer device A7 including a lifting arm is provided near the shelf unit U10. The transfer device A7 moves the wafer W up and down between the cells of the shelf unit U10.

A shelf unit U11 is provided in the processing block 5 on the side of the interface block 6. The shelf unit U11 is divided into a plurality of cells arranged in the vertical direction.

The interface block 6 delivers the wafer W to and from the exposure apparatus 3. For example, the interface block 6 is provided with a transfer device A8 including a delivery arm built therein and is connected to the exposure apparatus 3. The transfer device A8 transfers the wafer W disposed on the shelf unit U11 to the exposure apparatus 3, receives the wafer W from the exposure apparatus 3, and returns the wafer W to the shelf unit U11.

[Inspection Unit]

The inspection units U3 included in the processing modules 11 to 14 will be described. The inspection units U3 included in the processing modules 11 to 13 have a function of obtaining image data (unprocessed image) of a surface of an unprocessed substrate, which is a wafer W before a process (developing process) relating to the resist film R. Further, the inspection unit U3 included in the processing module 14 has a function of obtaining image data (processed image) of the surface of the wafer W after the process (developing process) relating to the resist film R.

Figure 3:
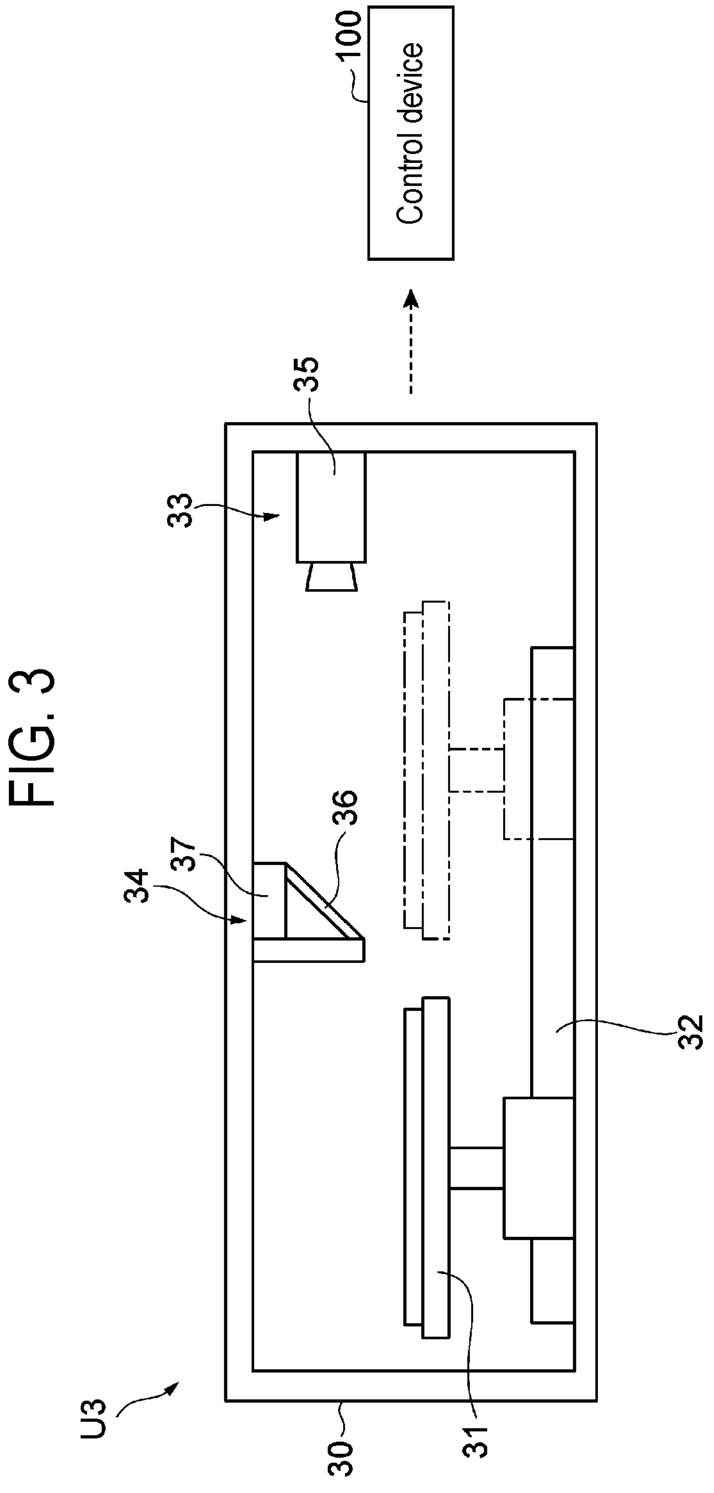
FIG. 3 is a schematic view illustrating an example of an inspection unit.

As shown in FIG. 3, the inspection unit U3 includes a housing 30, a holder 31, a linear driver 32, a capturer 33, and a transmitter/reflector 34. The holder 31 holds the wafer W horizontally. The linear driver 32 uses, for example, an electric motor as a power source, and moves the holder 31 along a horizontal linear path. The capturer 33 has a camera 35 such as a CCD camera or the like. The camera 35 is provided on one end side in the inspection unit U3 in the movement direction of the holder 31 and is oriented to the other end side in the movement direction. The transmitter/reflector 34 transmits light over a capturing range and guides a reflected light reflected in the capturing range toward the camera 35. For example, the transmitter/reflector 34 has a half mirror 36 and a light source 37. The half mirror 36 is provided at a position higher than the holder 31 in the middle portion of the movement range of the linear driver 32, and is configured to reflect light from below toward the camera 35. The light source 37 is provided above the half mirror 36, and is configured to irradiate illumination light downward through the half mirror 36.

The inspection unit U3 operates as follows to acquire image data of the surface of the wafer W. First, the linear driver 32 moves the holder 31. Thus, the wafer W passes under the half mirror 36. In this passing process, the reflected light from each portion of the surface of the wafer W is sequentially sent to the camera 35. The camera 35 focuses an image using the reflected light from each portion of the surface of the wafer W, and acquires the image data of the surface of the wafer W. When a shape (for example, line width or the like) of the film formed on the surface of the wafer W is changed, for example, the color of the surface of the wafer W is changed according to such a shape change so that the image data about the surface of the wafer W obtained by the camera 35 is changed. That is, the acquisition of the image data of the surface of the wafer W is equivalent to the acquisition of information about the shape of the film formed on the surface of the wafer W.

The image data acquired by the camera 35 is sent to the control device 100. The control device 100 may estimate a shape characteristic value of the film on the surface of the wafer W based on the image data. The estimation result is held as an inspection result in the control device 100. The image data itself is also held in the control device 100.

The CD of the line width is the minimum width of the pattern of the developed target film (e.g., resist), and is approximately several nm to several μm. Here, it is assumed that the capturer 33 of the inspection unit U3 used to obtain the unprocessed image and the processed image does not have a resolution (resolution) enough to accurately measure the CD of the pattern from the captured image. In the image captured by the capturer 33, the color of the pattern portion is changed depending on the CD size. Therefore, information about the surface color (here, gray value) acquired for each pixel is changed depending on the shape of the pattern formed on the target film.

[Control Device]

An example of the control device 100 will be described in detail. The control device 100 controls respective elements included in the coating/developing apparatus 2. The control device 100 is configured to perform a process processing including forming each film described above on the surface of the wafer W and performing a development process. Further, the control device 100 is a main part of the shape characteristic value estimation apparatus and is configured to perform a process of estimating a shape characteristic value of the formed film. In the present disclosure, a configuration example of the control device 100 in the case of estimating the film thickness of the target film as the shape characteristic value in the coating/developing apparatus 2 will be described.

Figure 4:
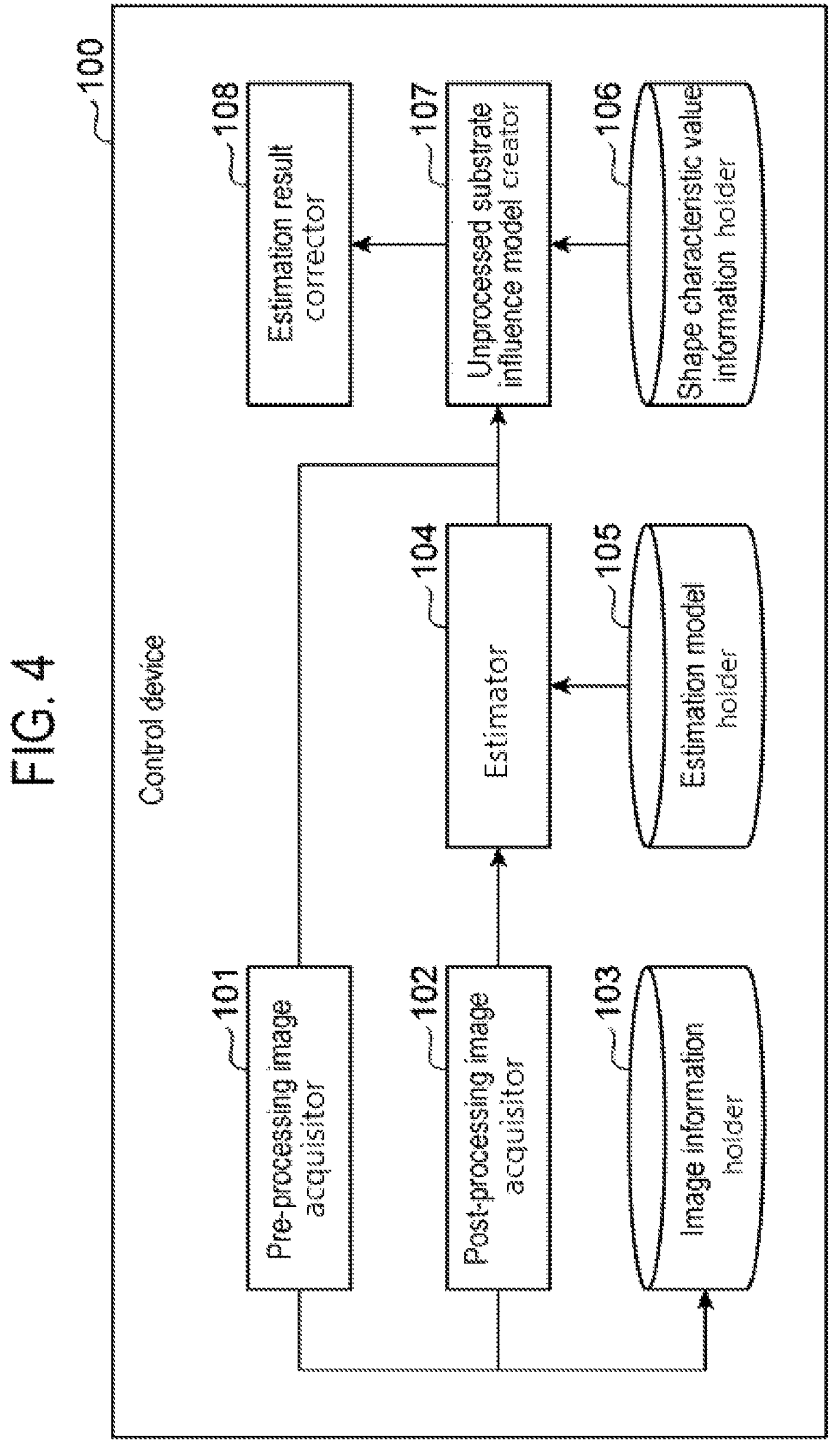
FIG. 4 is a block diagram illustrating an example of a functional configuration of a controller.

As illustrated in FIG. 4, the control device 100 includes an unprocessed-image acquisitor 101, a processed-image acquisitor 102, an image information holder 103, an estimator 104, an estimation model holder 105, and a shape characteristic value information holder 106 as functional components. In addition, the control device 100 further includes an unprocessed-substrate influence model creator 107 and an estimation result corrector 108. Each functional part illustrated in FIG. 4 is a functional part for implementing a function as a CD estimation apparatus as a kind of shape characteristic value estimation apparatus.

Before describing each functional part, an outline of a process (inspection) performed by the coating/developing apparatus 2 including the control device 100 as an apparatus for inspecting a substrate (shape characteristic value estimation apparatus) will be described. The coating/developing apparatus 2 performs a process of estimating CD of a film formed on a surface of a wafer W from an image obtained by capturing the surface of the wafer W. When a film is formed on the surface of the wafer W, the color of the surface changes depending on CD of patterns. Using this, the coating/developing apparatus 2 estimates CD at each point on the surface of the wafer W from the image data including information about the color of the surface of the wafer W.

As one example, a procedure for estimating CD is as follows. That is, first, a plural sheets of wafers for which CD of a film to be estimated (target film) is known are prepared. Then, a CD estimation model (shape characteristic value estimation model) associated with a correlation between information about the color of each pixel in image information obtained by capturing the surfaces of the wafers and CD of the film on the surface of the wafer at a position captured by the pixel is created. Thereafter, an image obtained by capturing the surface of the wafer on which the target film for which CD is to be estimated is formed and on which the developing process is performed, is acquired. CD of the film on the surface of the wafer is estimated based on the information about the color of each pixel included in the image data and the CD estimation model. This makes it possible to estimate CD of the target film on the surface of the wafer.

Figure 5:
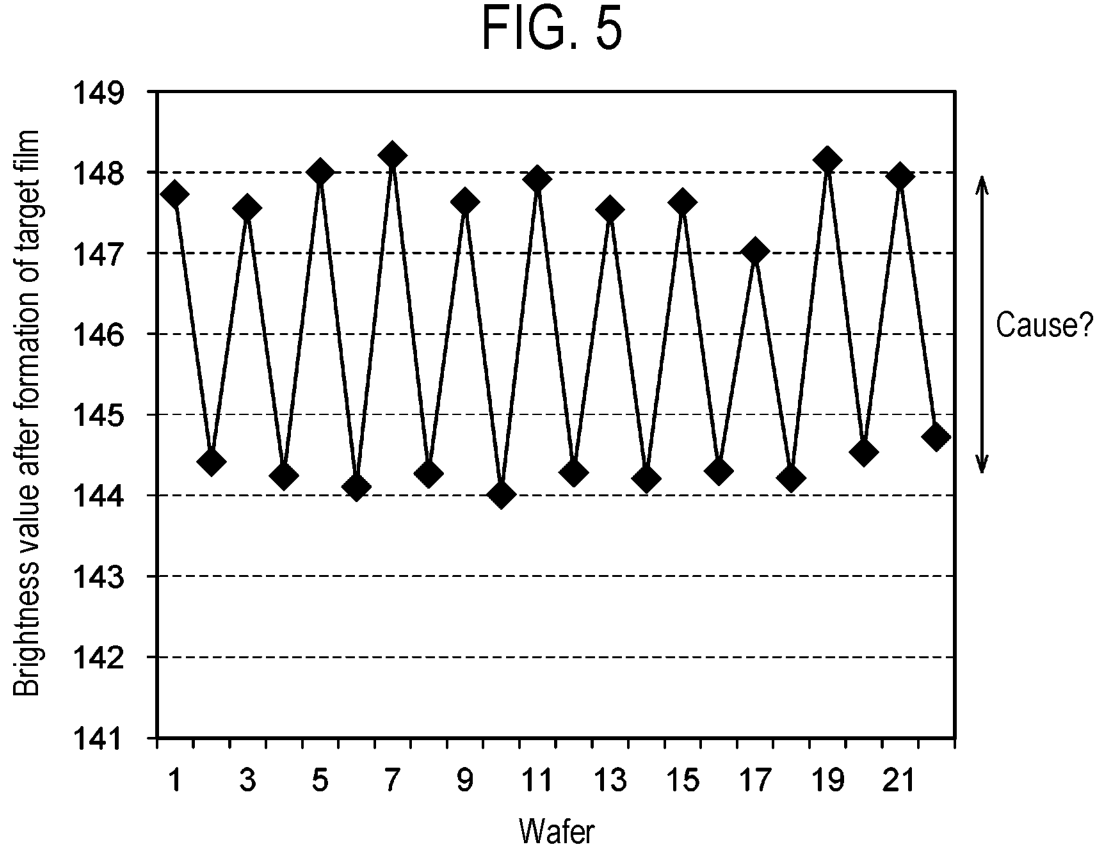
FIG. 5 is a view schematically illustrating a change in information about colors acquired from image data obtained by capturing plural sheets of wafers.

FIG. 5 schematically illustrates a change in information about a color acquired from the image data obtained by capturing the plural sheets of wafers. The information about the color of the surface (here, a gray value), acquired from the image data obtained by capturing the surface of the wafer after the target film is formed, is indicated in FIG. 5. As illustrated in FIG. 5, since a different color is indicated for each wafer, CD of the film on the surface of the wafer is estimated by using the difference in colors.

However, in the aforementioned method, there is a possibility that the CD estimation model that takes into consideration a state of an underlayer of the film for which CD is to be estimated has not been created. As described above, a plurality of films are formed on the wafer. Therefore, when the target film for which CD is to be estimated is a resist film, a lower layer film and an intermediate film are laminated under the resist film. Thus, the difference in the colors of the wafer surface for each wafer as illustrated in FIG. 5 is not a change derived from CD of the target film for which CD is to be estimated, but there is also a possibility that a variation in a state of a resist film or an underlying portion below the respective film is reflected. When the film thickness of the film formed on the surface is thin like the target wafer in the present embodiment, it is considered that the variation in the state of the underlying portion will be reflected in the variation in the color of the surface of the wafer.

The CD estimation model described above estimates a correlation between CD of the resist film and the color information in the image data, but it can be said that it does not consider a case where film thicknesses of the resist film and each film under the resist film are different from each other. For example, when the film thickness of the intermediate film under the resist film changes, there is a possibility that the color of the wafer surface may change depending on the film thickness of the intermediate film even before the resist film is coated. However, the CD estimation model may not sufficiently reflect the influence of such underlying film. In consideration of the aforementioned problems, there is proposed one scheme that the CD estimation model is created using a wafer in which the state (film thickness or the like) of the underlying film is changed. However, it is considered that it is difficult to prepare a considerable number of wafers that meet various conditions necessary to create a model with high estimation accuracy.

Therefore, in the coating/developing apparatus 2 described in the present embodiment, a model for estimating how much a difference in an underlying portion of an unprocessed substrate affects CD estimation results is created by using image information (unprocessed image) obtained by capturing an image of a surface of an unprocessed substrate, which is a wafer on which a resist film has been formed and a developing process relating to the resist film has not been performed. Specifically, for the wafer on which a process relating to a target film has been performed after the target film is formed, a model is created from the CD estimation results using the CD estimation model, CD values obtained by a method that does not use the CD estimation model, and the image information of the surface of the unprocessed substrate, which is a wafer before the target film is developed. This model (unprocessed-substrate influence model) is a model that estimates from the image data of the unprocessed substrate how much the resist film and the underlying portion affects the estimation results of the CD of the target film using the CD estimation model. In the coating/developing apparatus 2 described in the present embodiment, the unprocessed-substrate influence model is used to remove CD errors resulting from variations in film thickness in the underlying portion and the like, and to calculate more accurate CD estimation results. The control device 100 performs a process relating to such high precision CD estimation.

The unprocessed-image acquisitor 101 of the control device 100 shown in FIG. 4 has a function of acquiring image information (unprocessed image) about the surface of the unprocessed substrate, which is a wafer not subjected to the developing process relating to a formed target film. The unprocessed-image acquisitor 101 acquires an unprocessed image of the target wafer W, for example, by controlling the inspection unit U3 of the processing module 13.

The processed-image acquisitor 102 has a function of obtaining a processed image including image information of the surface of the wafer W after the process of the target film (specifically, the developing process) is performed. The processed-image acquisitor 102 obtains a processed image of the target wafer W, for example, by controlling the inspection unit U3 of the processing module 14.

The image information holder 103 has a function of holding the unprocessed image acquired by the unprocessed-image acquisitor 101 and the processed image acquired by the processed-image acquisitor 102. The image information held in the image information holder 103 is used in estimating CD of the target film formed on the wafer W.

The estimator 104 has a function of estimating CD of the target film based on the processed image held in the image information holder 103. The estimator 104 uses the CD estimation model to estimate CD. The CD estimation model is an estimation model for estimating CD of the target film based on a draft of the information about the color of the surface of the wafer W included in the processed image and CD of the target film formed on the wafer W. The estimator 104 estimates CD of the target film by applying the estimation model to the processed image.

The estimation model holder 105 has a function of holding a CD estimation model used for CD estimation performed by the estimator 104. The CD estimation model is a model for calculating CD from color information about each pixel in image data obtained by capturing the surface of the wafer W after the process of the target film (specifically, the developing process) is performed, and indicates correspondence between the color information and the CD. By acquiring the color information about the surface of the wafer W at each position of the image data using such a model, it is possible to estimate CD from the color information. The method of creating the CD estimation model is not particularly limited. The CD estimation model is created using known statistical processing techniques. Information about a change in color of the substrate surface due to the formation of the film is acquired from the information about the color of the surface of the unprocessed substrate included in the unprocessed image obtained by the unprocessed-image acquisitor 101 and the information about the color of the surface of the processed substrate included in the processed image acquired by the processed-image acquisitor 102. Then, the CD estimation model is created by calculating the correlation between the change in color and the CD. However, the above method is an example, and is not limited to the above-described example. For example, the CD estimation model is created by calculating the correlation between the change in color and the CD using only the information about the color of the surface of the processed substrate, without using the information about the color of the surface of the unprocessed substrate. The CD estimation model is created by the coating/developing apparatus 2 or, for example, by another apparatus.

The shape characteristic value information holder 106 has a function of holding information about CD of the target film, which corresponds to the shape characteristic value of the target film acquired without using the CD estimation model. CD of the target film acquired without using the CD estimation model is, for example, a measurement value of CD of the target film measured by a certain method. In addition, when the coating/developing apparatus 2 operates stably, for example, a film is formed on an inspection substrate and evaluation is performed on the formed film during a detailed inspection (QC inspection) relating to confirming the operation of the apparatus. Therefore, inspection results at this time is used as CD. Further, as long as characteristics of each of the plurality of units for film formation (the coating unit, the heat treatment unit, etc.) included in the coating/developing apparatus 2 is grasped to some extent, it may also be possible to adopt a configuration in which CD is calculated based on which unit performs a process. In addition, as long as it is grasped in advance that CD after film formation is changed gradually from the characteristics of the apparatus, a value obtained by adding a predicted change over time to a regularly-measured value is used as CD. Such a CD is a value that is highly reliable to some extent and is obtained (or calculated) without using the CD estimation model, and is obtained using various methods. CD held in the shape characteristic value information holder 106 is acquired while performing a process relating to film formation on the wafer W, when actual measurement is performed by a certain method, or is obtained (calculated) in advance when a predicted value or the like is used as CD. Further, one CD value is set for each wafer W, or a plurality of CD values is defined for one wafer W (e.g., for each shot or die).

The unprocessed-substrate influence model creator 107 has a function of creating an unprocessed-substrate influence model based on the CD estimation result, CD of the target film obtained without using the CD estimation model, and the unprocessed image that is the image of the unprocessed substrate which is an unprocessed wafer relating to the target film. Specifically, the unprocessed-substrate influence model creator 107 creates the unprocessed-substrate influence model, which is a model relating to the correlation between the difference between the estimation result and CD of the target film obtained without using the CD estimation model, and the unprocessed image (information about the color of the unprocessed substrate). The unprocessed-substrate influence model is created after a certain amount of estimation results using the CD estimation model have been accumulated. Details of the unprocessed-substrate influence model creator 107 will be described later.

The estimation result corrector 108 has a function of correcting the estimation result of CD of the target film obtained by the estimator 104, based on the unprocessed-substrate influence model created by the unprocessed-substrate influence model creator 107. Using the unprocessed-substrate influence model, it is possible to estimate whether the resist film, the underlying portion, or the like affects the CD estimation result. Therefore, a more accurate CD estimation result is obtained by removing components affected by the resist film, the underlying portion, or the like from the CD estimated by the CD estimation model.

Figure 6:
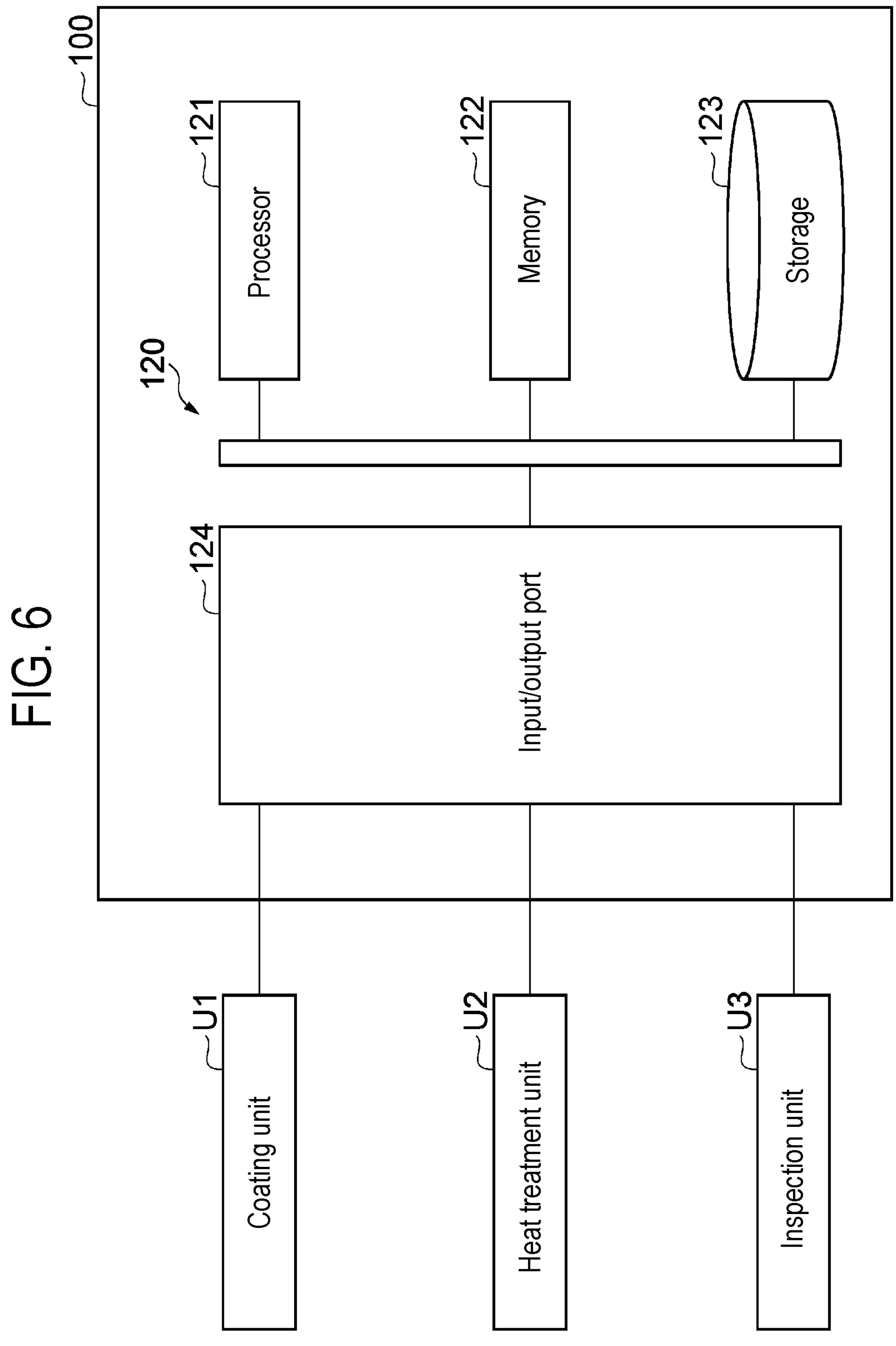
FIG. 6 is a block diagram illustrating an example of a hardware configuration of the controller.

The control device 100 is composed of one or more control computers. For example, the control device 100 includes a circuit 120 shown in FIG. 6. The circuit 120 includes one or more processors 121, a memory 122, a storage 123, and an input/output port 124. The storage 123 includes a non-transitory computer-readable storage medium such as a hard disk or the like. The storage medium stores a program for causing the control device 100 to execute a substrate inspection procedure described later. The storage medium is a removable medium such as a non-volatile semiconductor memory, a magnetic disk, or an optical disk. The memory 122 temporarily stores the program loaded from the storage medium of the storage 123 and the calculation result obtained by the processor 121. The processor 121 constitutes each functional module described above by executing the above program in cooperation with the memory 122. The input/output port 124 inputs and outputs an electric signal to and from a control target member according to a command from the processor 121.

The hardware configuration of the control device 100 is not necessarily limited to the one in which each functional module is constituted by the program. For example, each functional module of the control device 100 is constituted by a dedicated logic circuit or an ASIC (Application Specific Integrated Circuit) in which the dedicated logic circuit is integrated.

Further, in the following embodiment, a case where the aforementioned configuration is included in the control device 100 will be described, but all the aforementioned functions may not be included in the control device 100. For example, the functional part as a database, such as the image information holder 103, the estimation model holder 105, and the shape characteristic value information holder 106 or the like, is configured to be installed in an external device.

[Process Procedure]

Next, a process procedure executed in the coating/developing apparatus 2 will be described as an example of a coating/developing process.

In the process procedure, first, the control device 100 controls the transfer device A1 so as to transfer a target wafer W in the carrier C to the shelf unit U10, and controls the transfer device A7 so as to arrange the wafer W in the cell for the processing module 11.

Subsequently, the control device 100 controls the transfer device A3 so as to transfer the wafer W of the shelf unit U10 to the coating unit U1 and the heat treatment unit U2 in the processing module 11. Further, the control device 100 controls the coating unit U1 and the heat treatment unit U2 so as to form a lower layer film on the surface of the wafer W. Thereafter, the control device 100 controls the transfer device A3 so as to return the wafer W on which the lower layer film is formed to the shelf unit U10, and controls the transfer device A7 so as to arrange the wafer W in the cell for the processing module 12.

Subsequently, the control device 100 controls the transfer device A3 so as to transfer the wafer W of the shelf unit U10 to the coating unit U1 and the heat treatment unit U2 in the processing module 12. Further, the control device 100 controls the coating unit U1 and the heat treatment unit U2 so as to form an intermediate film on the lower layer film of the wafer W. For example, the control device 100 controls the coating unit U1 so as to form the intermediate film by coating a processing liquid for forming the intermediate film onto the lower layer film of the wafer W. Subsequently, the control device 100 controls the heat treatment unit U2 so as to perform heat treatment on the intermediate film. Thereafter, the control device 100 controls the transfer device A3 so as to return the wafer W to the shelf unit U10, and controls the transfer device A7 so as to arrange the wafer W in the cell for the processing module 13.

Subsequently, the control device 100 controls the transfer device A3 so as to transfer the wafer W of the shelf unit U10 to each unit in the processing module 13, and controls the coating unit U1 and the heat treatment unit U2 so as to form a resist film on the intermediate film of the wafer W. For example, the control device 100 controls the coating unit U1 so as to form the resist film by coating a processing liquid for forming the resist film onto the intermediate film of the wafer W. Subsequently, the control device 100 controls the heat treatment unit U2 so as to perform heat treatment on the resist film. After forming the resist film, the control device 100 controls the transfer device A3 so as to transfer the wafer W to the inspection unit U3, and controls the inspection unit U3 so as to acquire image information (unprocessed image) by capturing the surface of the wafer W. Thereafter, the control device 100 controls the transfer device A3 so as to transfer the wafer W to the shelf unit U11.

Subsequently, the control device 100 controls the transfer device A8 so as to send the wafer W of the shelf unit U11 to the exposure apparatus 3. Thereafter, the control device 100 controls the transfer device A8 so as to receive the wafer W, which has been subjected to the exposure process, from the exposure apparatus 3, and arrange the wafer W in the cell for the processing module 14 in the shelf unit U11.

Subsequently, the control device 100 controls the transfer device A3 so as to transfer the wafer W of the shelf unit U11 to each unit in the processing module 14, and controls the developing unit and the heat treatment unit U2 so as to perform a development process on the resist film R of the wafer W. After the development process, the control device 100 controls the transfer device A3 so as to transfer the wafer W to the inspection unit U3, and controls the inspection unit U3 to capture an image of the surface of the wafer W and acquire image information thereabout (processed image). Thereafter, the control device 100 controls the transfer device A3 so as to return the wafer W to the shelf unit U10, and controls the transfer device A7 and the transfer device A1 so as to return the wafer W into the carrier C. Consequently, the process processing is completed.

[CD Estimation Method]

Next, a CD estimation method in the processing modules 11 to 14 by the control device 100 will be described with reference to FIGS. 7 to 10. The CD estimation method is a method related to the inspection of the wafer W after film formation, which is performed in the inspection units U3 provided in the processing modules 11 to 14. The inspection unit U3 evaluates whether a desired film has been formed on the wafer W after the film formation, particularly, whether a film having a desired CD has been formed by estimating CD.

In the following embodiment, a case of estimating CD of a resist film will be described. Therefore, a target process is the developing process, and a wafer W before performing the developing process (i.e., a wafer on which up to the resist film is formed) will be described as an unprocessed substrate. However, the target film is not limited to the resist film. For example, a film thickness of an intermediate film is estimated by using the target film as the intermediate film. In that case, the unprocessed substrate becomes a wafer before the intermediate film is formed, i.e., a wafer on which an underlying film is formed. In this manner, the setting of the unprocessed substrate is changed according to the target film for which CD is to be estimated. Further, the unprocessed substrate is a substrate which has been subjected to any process (for example, film formation, etching, cleaning, or the like) by another apparatus. As described above, the unprocessed substrate is a substrate before forming the target film, and is not particularly limited.

Figure 7:
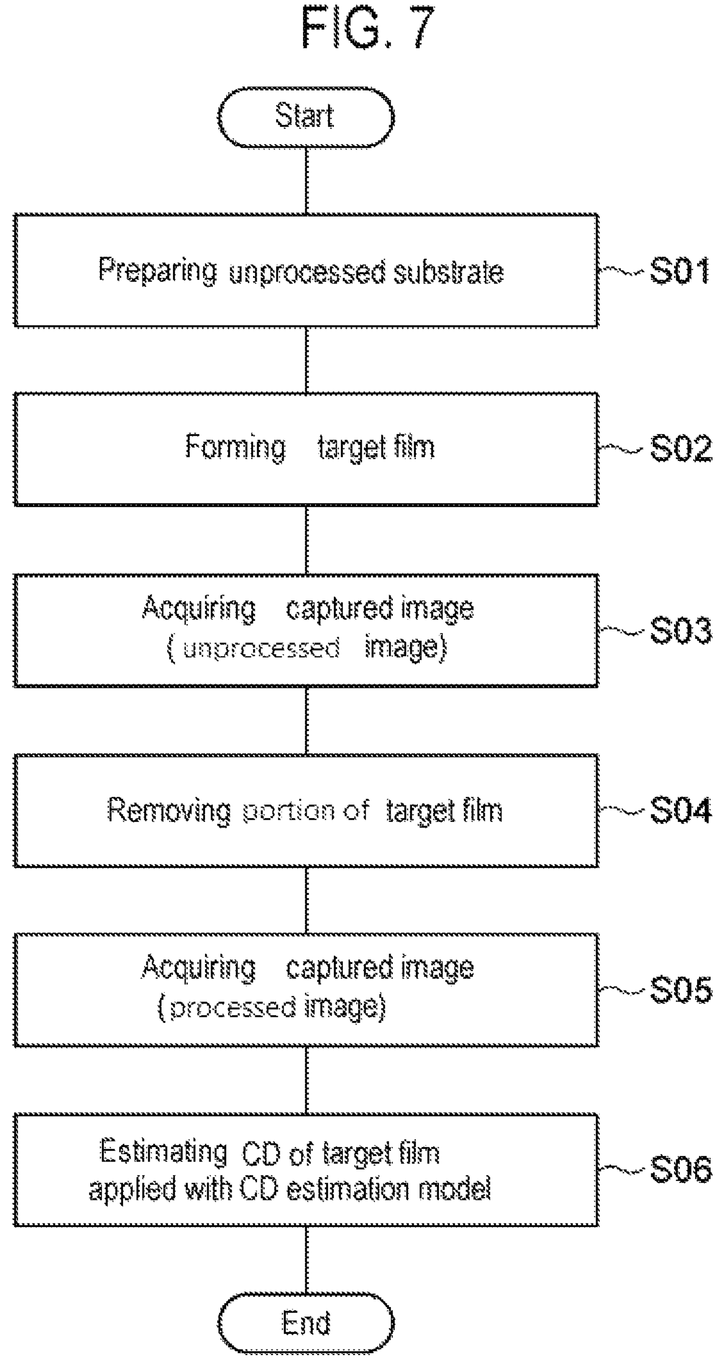
FIG. 7 is a flowchart illustrating an example of a CD estimation method.

FIG. 7 is a flowchart illustrating a procedure up to CD estimation to which the CD estimation model is applied in a series of flows of the CD estimation method. First, the control device 100 executes step S01. In step S01, the underlying substrate is prepared and loaded into the inspection unit U3. The underlying substrate is a wafer W on which up to the intermediate film has been formed in the coating unit U1 and the heat treatment unit U2 as described above. The loaded underlying substrate is held by the holder 31.

Subsequently, the control device 100 executes step S02. In step S02, the resist film, which is a target film, is formed on the underlying substrate. Subsequently, the unprocessed-image acquisitor 101 of the control device 100 executes step S03. In step S03, the capturer 33 captures an image of the surface of the unprocessed substrate. Specifically, while moving the holder 31 in a predetermined direction by operating the linear driver 32, the capturer 33 captures the image of the surface of the unprocessed substrate. Thus, image information (unprocessed image) about the surface of the unprocessed substrate is acquired by the capturer 33. The unprocessed image is held by the image information holder 103 of the control device 100.

Subsequently, the control device 100 executes step S04. In step S04, a portion of the target film is removed by the developing process. The wafer W that has been subjected to the developing process is loaded into the inspection unit U3. The loaded wafer W after the developing process is held by the holder 31.

Subsequently, the unprocessed-image acquisitor 102 of the control device 100 executes step S05. In step S05, like in step S02, the capturer 33 captures an image of the surface of the processed wafer W. Specifically, while moving the holder 31 in a predetermined direction by operating the linear driver 32, the capturer 33 captures the image of the surface of the wafer W. Thus, image information (processed image) about the surface of the wafer W is acquired by the capturer 33. The processed image is held by the image information holder 103 of the control device 100.

Subsequently, the estimator 104 of the control device 100 executes step S06. In step S06, CD of the target film on the surface of the wafer W is estimated based on the processed image of the surface of the wafer W. The estimator 104 uses the CD estimation model held in the estimation model holder 105 to estimate the CD.

Specifically, the method of estimating CD from the processed image is as follows. First, information about the color of the surface of the wafer W for each pixel is acquired from the processed image. At this time, a process is performed to calculate a correlation with an image of the underlying substrate before film formation. Whether or not to perform this procedure is changed as appropriate depending on conditions of the CD estimation model. Thereafter, a comparison is made with the CD estimation model held in the estimation model holder 105. Thus, it is possible to estimate CD of a region for which an image is captured for each pixel. This makes it possible to estimate CD of the target film at each position on the surface of the wafer W.

Subsequently, in the CD estimation method described in the present embodiment, correction is performed using an unprocessed-substrate influence model shown in FIG. 8.

Figure 8:
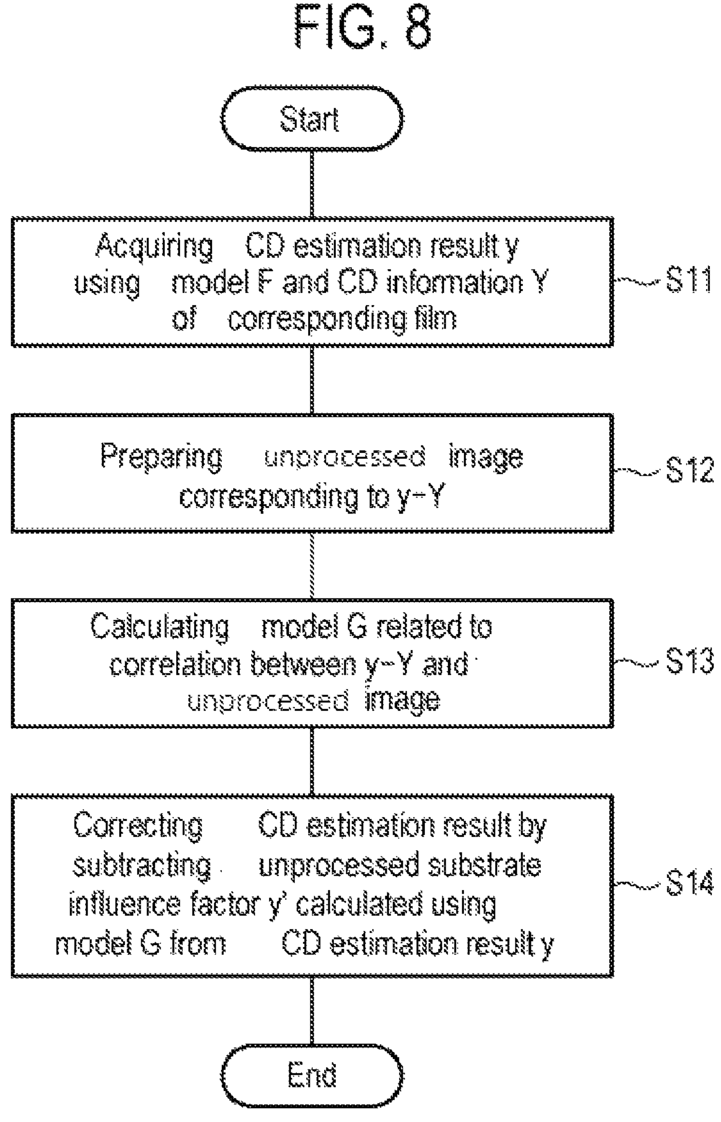
FIG. 8 is a flowchart illustrating an example of the CD estimation method.

As shown in FIG. 8, the unprocessed-substrate influence model creator 107 of the control device 100 sequentially executes steps S11 to S13 relating to creating the unprocessed-substrate influence model. In step S11, first, CD estimation result y of the target film using a CD estimation model F at a specific pixel and CD information Y of the target film obtained without using the CD estimation model are acquired. In step S12, a unprocessed image of the wafer W whose CD has been estimated is prepared. Then, in step S13, an unprocessed-substrate influence model G associated with correlation between a difference between the CD estimation result y and the CD information Y, and the color information included in the unprocessed image is created. After creating the unprocessed-substrate influence model G, the estimation result corrector 108 of the control device 100 executes step S14. In step S14, the CD estimation result is corrected by subtracting an unprocessed substrate influence factor y' calculated using the unprocessed-substrate influence model G from the CD estimation result y of the target film. These steps will be described below.

The CD estimation result obtained using the CD estimation model in the processed image is referred to as y, and the CD information of the target film obtained without using the CD estimation model is referred to as Y. Further, the CD estimation model created based on the image after the developing process (the processed image) is referred to as F. Since the CD estimation result y is calculated using the CD estimation model, it should satisfy a relationship of formula (1) below.

$$y = F(\text{processed image}) \tag{1}$$

Here, when the accuracy of the CD estimation model is sufficiently high, the CD estimation result y should match the CD information Y. However, in practice, the following formula (2) holds true.

$$Y = F(\text{processed image}) + \text{error } 1 \tag{2}$$

Figure 9:
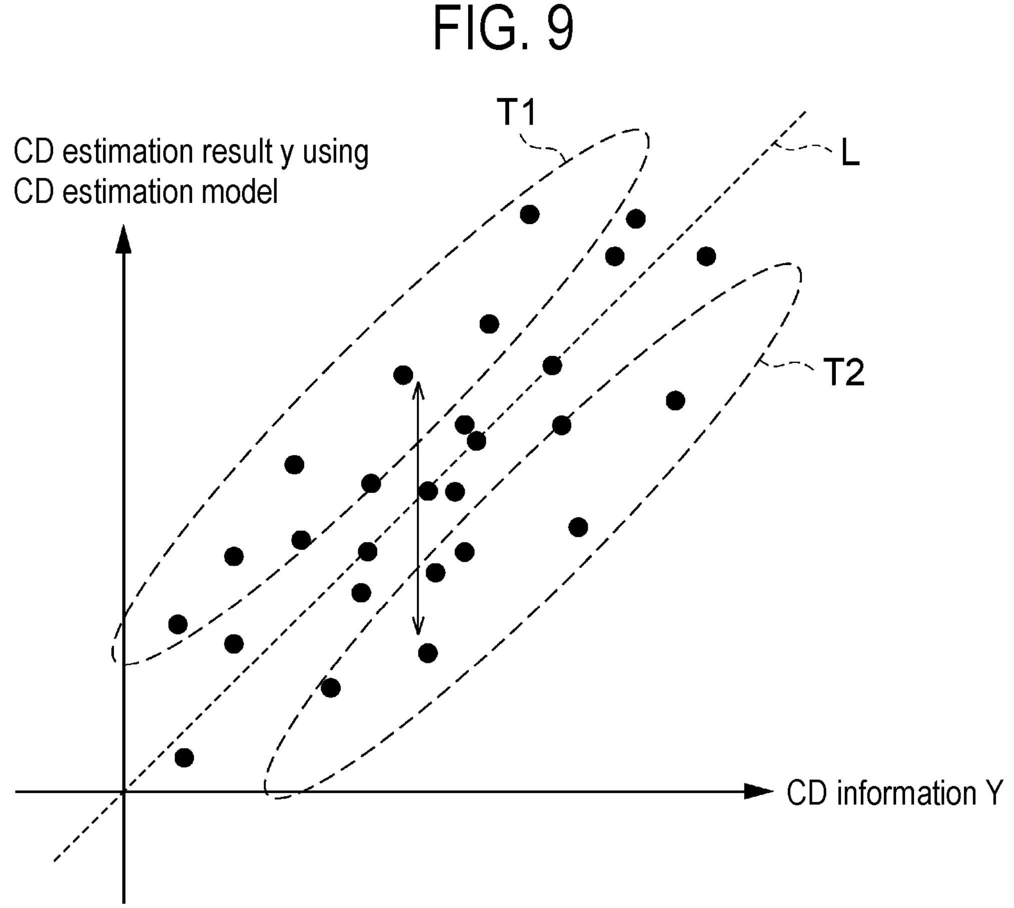
FIG. 9 is a schematic diagram illustrating an example of a variation in estimation results by a CD estimation model.

FIG. 9 schematically shows a state in which the CD estimation result may include an error "error 1" as shown in formula (2). In FIG. 9, the relationship between the CD estimation result y and the CD information Y at a specific pixel is plotted for each target wafer W. When the CD estimation result y and the CD information Y match, the points should be lined up on the straight line L (y=Y) shown in FIG. 9. However, in practice, the CD estimation result y and the CD information Y do not match. There are a group T1 in which the CD estimation result y is larger than the CD information Y and a group T2 in which the CD estimation result y is smaller than the CD information Y. "Error 1" in formula (2) may include not only a simple error but also an error due to insufficient accuracy of the CD estimation model F. One possible reason for the decrease in the accuracy of the CD estimation model F appears to be that the variations originating from the unprocessed substrate before the target process cannot be sufficiently removed as described above.

Therefore, as the unprocessed-substrate influence model, the correlation between the color information obtained from the unprocessed image and the portion corresponding to "error 1" is grasped. When the unprocessed-substrate influence model is referred to as G, the unprocessed-substrate influence model satisfies the following formula (3).

$$y - Y = G(\text{unprocessed image}) + \text{error } 2 \tag{3}$$

It is thought that "error 1" in formula (2) includes the variation originating from the unprocessed substrate as described above. However, as described above, the component originating from the unprocessed substrate is used as the unprocessed-substrate influence model G. As a result, the component originating from the unprocessed substrate is removed from "error 2" in formula (3), and only the so-called simple error is included.

Figure 10:
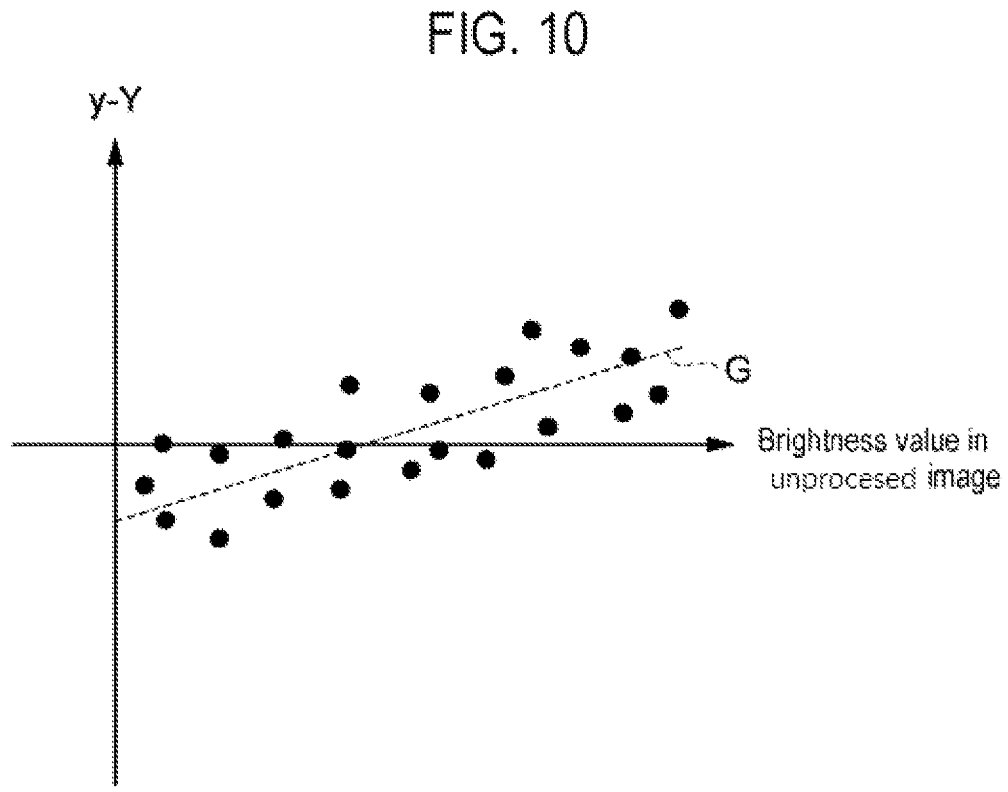
FIG. 10 is a schematic diagram for explaining an example of an unprocessed-substrate influence model.

In FIG. 10, the unprocessed-substrate influence model G is schematically shown. The unprocessed-substrate influence model G is a model that indicates, for example, the correlation between the information about the color of the surface of the unprocessed substrate in the unprocessed image (e.g., a brightness value in the unprocessed image) and y−Y. By modeling the correlation between the information about the color of the surface of the unprocessed substrate (e.g., the brightness value in the unprocessed image) and y−Y as shown in FIG. 10, it is possible to perform correction according to the color of the surface of the unprocessed substrate. In other words, it is possible to grasp, from the unprocessed-substrate influence model G, the variation due to the unprocessed substrate (corresponding to y−Y), which is considered to be included in the estimated value of CD estimated using the CD estimation model F.

When the unprocessed substrate influence factor determined from the unprocessed-substrate influence model at a specific pixel is referred to as y', the y' satisfies the following formula (4).

$$y' = G(\text{unprocessed image}) \tag{4}$$

By subtracting the CD influence factor y' from the CD estimation result y estimated using the CD estimation model F, it is possible to bring the CD estimation result y closer to the CD information Y, i.e., a more accurate value. As shown in formula (5), y−y' includes the error 2 relating to the simple error. However, since the error 2 does not include a model error as described above, it is possible to remove the model error that is included in the estimation result from y−y' when the CD estimation model F is used.

$$y - y' = y - (y - Y) + \text{error } 2 = Y - \text{error } 2 \tag{5}$$

Although FIG. 10 shows a state in which the unprocessed-substrate influence model G is a linear function with respect to the brightness value of the unprocessed image, which shows a simpler example for the purpose of description. As shown in FIG. 10, the unprocessed-substrate influence model G is obtained as a linear function using only one value as the information about the color of the unprocessed image. However, more complex statistical methods is used to implement modeling with higher accuracy. In other words, instead of using only the brightness value as the information about the color of the unprocessed image when creating the unprocessed-substrate influence model G, for example, multiple parameters such as RGB values and the like is used, and a model is created by a statistical method using these feature quantities. The unprocessed-substrate influence model G is created using, for example, multiple regression analysis, nonlinear analysis, decision tree analysis, or other statistical methods such as well-known regression analysis.

The creation of the unprocessed-substrate influence model G and the correction of the CD estimation result using the unprocessed-substrate influence model G (a series of processes shown in FIG. 8) described above is performed when a certain amount of CD estimation results for the target film using the CD estimation model F have been accumulated. This is because the extent to which the CD estimation model F includes variations originating from the unprocessed substrate (i.e., the component corresponding to the unprocessed-substrate influence model G) cannot be determined when the CD estimation model F is prepared. Therefore, after estimating the CD for a plurality of wafers W using the CD estimation model F, the above-mentioned unprocessed-substrate influence model G is created, and the CD estimation result is corrected using the unprocessed-substrate influence model G. In order to improve the accuracy of the unprocessed-substrate influence model G to some extent, the number of pieces of data for creating the unprocessed-substrate influence model G is about several dozen. However, the number of pieces of data is not limited to thereto.

Further, the unprocessed-substrate influence model G is modified at predetermined intervals. For example, when the number of wafers W processed in the coating/developing apparatus 2 exceeds a predetermined number, the unprocessed-substrate influence model G is created again using information about the most recent several dozen wafers W, and may also be reflected in the estimation of CDs of subsequent wafers W. In this way, the timing of creating the unprocessed-substrate influence model G, and the like is changed as appropriate in consideration of the operating conditions of the coating/developing apparatus 2, the characteristics of the wafer W, and the like.

The data used when creating the unprocessed-substrate influence model G is not limited to one for each wafer W. Since the CD estimation using the CD estimation model F is performed for each shot, for example, the unprocessed-substrate influence model G is created by incorporating the estimation results for each pixel.

[Details of Creation of Unprocessed-Substrate Influence Model]

Next, details of the creation of the unprocessed-substrate influence model by the unprocessed-substrate influence model creator 107 will be described. The method of creating the unprocessed-substrate influence model by the unprocessed-substrate influence model creator 107 is not limited to an embodiment described below.

When the number of processed images (i.e., the number of sample wafers) is equal to or greater than a predetermined value, the unprocessed-substrate influence model creator 107 performs a process to suppress overfitting, and then creates the unprocessed-substrate influence model. The term "overfitting" herein refers to a state in which a model is able to fit a learning sample but is not able to fit unknown data. An operation of creating the unprocessed-substrate influence model, which is performed while suppressing the overfitting, will be described below with reference to FIGS. 11 and 12A to 12D.

FIG. 11 is a flowchart showing the operation of creating the unprocessed-substrate influence model. As shown in FIG. 11, the unprocessed-substrate influence model creator 107 first determines whether the number of samples S, which are processed images, is equal to or greater than a predetermined value (here, 75) (step S31). When the number of samples S is not equal to or greater than the predetermined value in step S31, the unprocessed-substrate influence model creator 107 creates the unprocessed-substrate influence model from all the samples S without performing grouping to be described later (step S32).

Figure 12A:
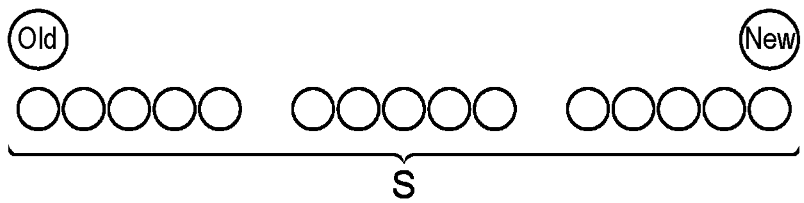
FIGS. 12A to 12D are diagrams for explaining how to divide samples in creating the unprocessed-substrate influence model.
Figure 12B:
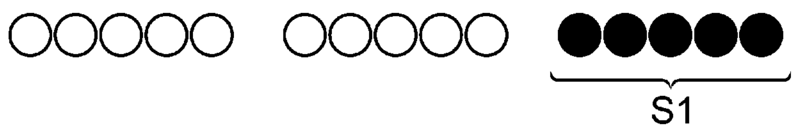

On the other hand, when the number of samples S is equal to or greater than the predetermined value, the samples S are arranged in chronological order as shown in FIG. 12A (step S13). Then, as shown in FIG. 12B, among the total N samples S, for example, N/3 samples S that are new in time series are set as a set (third set) of verification samples S1 (step S34).

Figure 12C:
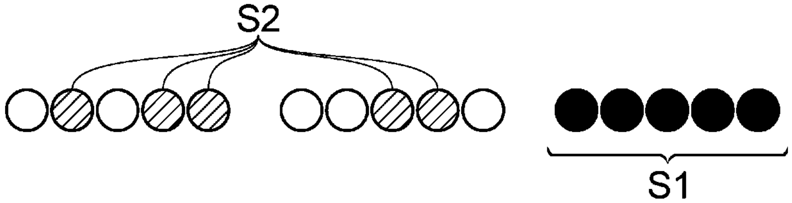
Figure 12D:
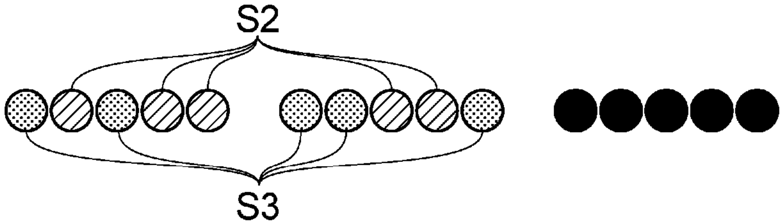

Then, as shown in FIG. 12C, the unprocessed-substrate influence model creator 107 randomly divides N/3 samples S2 into a first set of samples from the remaining samples S (step S35). Further, as shown in FIG. 12D, the unprocessed-substrate influence model creator 107 divides the remaining N/3 samples S3 into a second set of samples (step S36).

Subsequently, the unprocessed-substrate influence model creator 107 performs learning of the first set of samples (step S37), and creates a first candidate model formula $CD_1$ (first candidate) which is a candidate for the unprocessed-substrate influence model. The first candidate model formula $CD_1$ is represented by formula (6) below.

$$CD_1 = CD_0 + FUNC1(\text{Gray}) \quad (6)$$

In formula (6) above, $CD_0$ is an estimated value of CD estimated using the CD estimation model, Gray is a gray value of the unprocessed image, and FUNC1 is a function indicating an amount of correction by learning of the unprocessed substrate.

Then, the estimation result corrector 108 derives verification data in which the estimated value of CD relating to the verification sample S1 has been corrected, based on the first candidate model formula $CD_1$ (step S38). Specifically, the estimation result corrector 108 derives the verification data of the verification sample S1 by the following formula (7) using the first candidate model formula $CD_1$.

$$CD1_{verify} = CD0_{verify} + FUNC1(\text{Gray}_{verify}) \quad (7)$$

Further, based on the first candidate model formula $CD_1$, CD data (learning data) relating to the second set of samples S3 is derived as represented by formula (8) below. Group 2 indicates the second set of samples. Such learning data is CD data using first generation (first set of samples) learning.

$$CD1_{group2} = CD0_{group2} + FUNC1(\text{Gray}_{group2}) \quad (8)$$

Subsequently, the unprocessed-substrate influence model creator 107 performs learning of the second set of samples (step S39), and creates a second candidate model formula $CD_2$ (second candidate) which is a candidate for the unprocessed-substrate influence model. The second candidate model formula $CD_2$ is represented by the following formula (9).

$$CD_2 = CD_1 + FUNC2(\text{Gray}) \tag{9}$$

In formula (9) above, $CD_1$ is the CD data obtained after the first unprocessed substrate learning correction, and FUNC2 is a function indicating the correction amount by the second unprocessed substrate learning.

Then, the estimation result corrector 108 derives verification data in which the estimated value of CD relating to the verification sample S1 has been corrected, based on the second candidate model formula $CD_2$ (step S40). Specifically, the estimation result corrector 108 derives the verification data of the verification sample S1 by the following formula (10) using the second candidate model formula $CD_2$.

$$CD_{2verify} = CD_{1verify} + FUNC2(\text{Gray}_{verify}) \tag{10}$$

Subsequently, it is determined whether or not the operations in steps S15 to S20 have been performed a predetermined number of times (step S21). The operations in steps S35 to S40 are repeatedly performed until the operations in steps S15 to S20 have been performed a predetermined number of times. In this way, the unprocessed-substrate influence model creator 107 performs an operation of dividing the plurality of samples S into the first set of samples, the second set of samples, and the set of verification samples S1 (third set of samples). This operation is repeated multiple times while changing a combination of the samples S included in the first set of samples and the second set of samples.

Then, when the operations in steps S35 to S40 are performed a predetermined number of times, the unprocessed-substrate influence model creator 107 compares the verification data based on a model formula for each of the first set of samples and the verification data based on a model formula for each of the second set of samples. For example, the unprocessed-substrate influence model creator 107 selects, as a best model, the candidate model formula in which the variation value of the verification data (e.g., 30 of a difference from the CD value obtained without using the estimation model) is the minimum value, and determines the candidate model as the unprocessed-substrate influence model (step S42). When there is an already-created unprocessed-substrate influence model, the unprocessed-substrate influence model creator 107 may compare a variation value of a new unprocessed-substrate influence model (e.g., 30 of a difference from a CD value obtained without using the estimation model) and a variation value of the created unprocessed-substrate influence model. Then, the new unprocessed-substrate influence model is adopted when an improvement in variation value is confirmed. When there are few variation factors in the sample, there is a risk that a learning model with an advanced generation will be overfitted. In this case, the variation value of the verification sample will be large. Therefore, a past (old) learning model will be selected. This makes it possible to safely increase the number of factors.

[Actions]

The shape characteristic value estimation apparatus (CD estimation apparatus) according to the present embodiment includes the processed-image acquisitor 102 configured to acquire the processed image including the image information about the surface of the processed wafer W, which is relating to the target film. The shape characteristic value estimation apparatus includes the estimator 104. The estimator 104 estimates CD of the target film by applying the CD estimation model, which relates to the correlation between the information about the color of the surface of the wafer W included in the processed image and CD of the target film formed on the wafer W, to the processed image. The shape characteristic value estimation apparatus includes the unprocessed-substrate influence model creator 107. The unprocessed-substrate influence model creator 107 creates the unprocessed-substrate influence model, which is a model relating to the correlation between the difference between the CD estimation result of the target film obtained by the estimator 104 and CD obtained without using the CD estimation model, and the information about the color of the unprocessed substrate, which is a wafer W for which a target film is not processed. The shape characteristic value estimating apparatus includes the estimation result corrector 108 configured to correct the estimation result of CD of the target film obtained by the estimator 104, based on the unprocessed-substrate influence model. The unprocessed-substrate influence model creator 107 is configured to perform dividing a plurality of processed images into a first set of processed images and a second set of processed images. The unprocessed-substrate influence model creator 107 is configured to perform creating a first candidate, which is a candidate for the unprocessed-substrate influence model, based on the first set of processed images, and also creating a second candidate, which is a candidate for the unprocessed-substrate influence model, based on the second set of processed images. The unprocessed-substrate influence model creator 107 compares a result of correction of the estimation result by the estimation result corrector 108 based on the first candidate, and a result of correction of the estimation result by the estimation result corrector 108 based on the second candidate. As a result, the unprocessed-substrate influence model is determined.

In the shape characteristic value estimation apparatus according to the present embodiment, first, CD of the target film is estimated using the CD estimation model. Subsequently, the unprocessed-substrate influence model, which is a model relating to the correlation between the difference between the CD estimation result of the target film and CD of the target film obtained without using the CD estimation model, and the information about the color of the unprocessed substrate included in the unprocessed image, is created. Then, the estimation result is corrected based on the unprocessed-substrate influence model. With such a configuration, it is possible to correct the variation component of the estimation result due to the color of the unprocessed substrate, or the like, based on the unprocessed-substrate influence model. Therefore, the characteristic value (e.g., CD) relating to the shape of the target film formed on the wafer W is estimated with higher accuracy. In the shape characteristic value estimation apparatus according to the present embodiment, the processed image is divided into a first set of images and a second set of images, and a candidate for the unprocessed-substrate influence model is created for each of the first set of images and the second set of images. Then, the estimation results of the shape characteristic values obtained by the estimator 104 are corrected for each candidate for the unprocessed-substrate influence model, and the correction results for each candidate are compared to each other to select (determine) an appropriate unprocessed-substrate influence model. In the case where the unprocessed-substrate influence model is created from a plurality of processed images, when there are too many learning samples, overfitting (a state capable of being fitted to the learning samples but not to unknown data) may occur. In this case, the correction accuracy of the unprocessed-substrate influence model may decrease. In this regard, the plurality of processed images are divided into a plurality of groups, and learning is performed for each group to create candidates for the unprocessed-substrate influence model. Therefore, the number of factors learned at once is reduced, which suppresses the overfitting. Then, by comparing the correction results for each candidate of the unprocessed-substrate influence model and selecting (determining) the appropriate unprocessed-substrate influence model, it is possible to create the unprocessed-substrate influence model with high correction accuracy. By correcting the estimation results using the unprocessed-substrate influence model created in this way, the characteristic values relating to the shape of the target film formed on the wafer W is estimated with high accuracy.

The unprocessed-substrate influence model creator 107 divides a plurality of processed images into a first set of images, a second set of images, and a third set of images. The unprocessed-substrate influence model creator 107 compares a result of correction of the estimation result relating to the third set of images by the estimation result corrector 108 based on the first candidate, and a result of correction of the estimation result relating to the third set of images by the estimation result corrector 108 based on the second candidate. As a result, the unprocessed-substrate influence model is determined. By preparing learning samples and verification samples from the plurality of processed images in this way, it is possible to prepare the verification samples in an efficient and appropriate manner while reducing the number of factors learned at once.

The unprocessed-substrate influence model creator 107 repeats multiple times an operation of dividing the plurality of processed images into a first set of processed images, a second set of processed images and a third set of processed images while changing a combination of the plurality of processed images included in the first set of processed images the and second set of processed images. Then, the unprocessed-substrate influence model creator 107 determines the unprocessed-substrate influence model by comparing all of the result of correction of the estimation result relating to each of the first set of processed images and the result of correction of the estimation result relating to each of the second set of processed images with each other. In this way, a plurality of patterns of first and second candidates are created while changing the samples included in each set, and the correction results based on each candidate are compared with each other. Therefore, it is possible to select the appropriate unprocessed-substrate influence model based on a plurality of correction results. That is, it is possible to select the unprocessed-substrate influence model that performs correction with higher accuracy while increasing the number of incorporated factors.

The unprocessed-substrate influence model creator 107 may perform the operation of dividing the plurality of processed images into the first set of processed images and the second set of processed images when the number of processed images is equal to or greater than a predetermined value. When the number of processed images is less than the predetermined value, the unprocessed-substrate influence model creator 107 may create the unprocessed-substrate influence model without performing the operation of dividing the plurality of processed images into the first set of processed images and the second set of processed images. When the above-described grouping is performed when the number of processed images is small, underfitting may occur due to factors that cannot be modeled. In this respect, the above-mentioned grouping is performed and learning is performed when the number of processed images is equal to or greater than the predetermined value. When the number of processed images is less than the predetermined value, the learning is performed without performing the grouping, which makes it possible to suppress both the overfitting and the underfitting. Thus, it is possible to create the unprocessed-substrate influence model with high correction accuracy, and to estimate the characteristic values relating to the shape of the target film formed on the wafer W with high accuracy.

According to the present disclosure in some embodiments, it is possible to provide a technique capable of accurately estimating characteristic values relating to a shape of a target film formed on a substrate.

Although various exemplary embodiments have been described above, the present disclosure is not limited to the above exemplary embodiments. Various omissions, substitutions, and changes is made.

For example, in the above-described embodiment, the case has been described in which the “shape characteristic value” is the critical dimension (CD) such as a line width. However, the “shape characteristic value” is a thickness of the target film. In this case, the process of the target film is coating the target film on the substrate, and the processed image is the image relating to the surface of the substrate coated with the target film. In other words, in the case of the CD estimation, the processed image is an image after the developing process with the target film partially removed. However, in the case of the film thickness estimation, the processed image is an image before the developing process with the target film not removed.

What is claimed is:

1. A shape characteristic value estimation apparatus, comprising:

a processed-image acquisitor configured to acquire a processed image including image information about a surface of a processed substrate after a process of a target film;

an estimator configured to estimate a shape characteristic value of the target film, by applying, to the processed image, an estimation model for estimating the shape characteristic value of the target film, the estimation model being associated with a correlation between information about a color of the substrate included in the processed image and the shape characteristic value relating to a shape of the target film formed on the substrate;

an unprocessed-substrate influence model creator configured to create an unprocessed-substrate influence model associated with a correlation between a difference between an estimation result of the shape characteristic value of the target film by the estimator and a shape characteristic value of the target film acquired without using the estimation model, and information about a color of an unprocessed substrate before the process of the target film, and an estimation-result corrector configured to correct the estimation result of the shape characteristic value of the target film by the estimator based on the unprocessed-substrate influence model, wherein the unprocessed-substrate influence model creator is configured to execute:

an operation of dividing a plural number of the processed image into a first set of processed images and a second set of processed images;

an operation of creating a first candidate for the unprocessed-substrate influence model based on the first set of processed images and creating a second candidate for the unprocessed-substrate influence model based on the second set of processed images; and an operation of determining the unprocessed-substrate influence model by comparing a result of correction of the estimation result by the estimation result corrector based on the first candidate with a result of correction of the estimation result by the estimation result corrector based on the second candidate.

2. The shape characteristic value estimation apparatus of claim 1, wherein the unprocessed-substrate influence model creator is configured to:

an operation of dividing the plural number of the processed image into the first set of processed images, the second set of processed images and a third set of processed images; and an operation of determining the unprocessed-substrate influence model by comparing a result of correction of an estimation result relating to the third set of processed images by the estimation result corrector based on the first candidate with a result of correction of the estimation result relating to the third set of processed images by the estimation result corrector based on the second candidate.

3. The shape characteristic value estimation apparatus of claim 2, wherein the unprocessed-substrate influence model creator is configured to:

an operation of repeating the operation of dividing the plural number of the processed image into the first set of processed images, the second set of processed images and the third set of processed images multiple times while changing a combination of the processed images included in the first set of processed images and the second set of processed images; and an operation of determining the unprocessed-substrate influence model by comparing a result of correction of the estimation result relating to the third set of processed images by the estimation result corrector based on the first candidate in relation to each of the first set of processed images with a result of correction of the estimation result relating to the third set of processed images by the estimation result corrector based on the second candidate in relation to each of the second set of processed images.

4. The shape characteristic value estimation apparatus of claim 3, wherein the unprocessed-substrate influence model creator is configured to:

perform the operation of dividing the plural number of the processed image into the first set of processed images and the second set of processed images when the number of the processed images is equal to or greater than a predetermined value; and create the unprocessed-substrate influence model without performing the operation of dividing the plural number of the processed image into the first set of processed images and the second set of processed images when the number of the processed images is less than the predetermined value.

5. The shape characteristic value estimation apparatus of claim 2, wherein the unprocessed-substrate influence model creator is configured to:

perform the operation of dividing the plural number of the processed image into the first set of processed images and the second set of processed images when the number of the processed images is equal to or greater than a predetermined value; and create the unprocessed-substrate influence model without performing the operation of dividing the plural number of the processed image into the first set of processed images and the second set of processed images when the number of the processed images is less than the predetermined value.

6. The shape characteristic value estimation apparatus of claim 1, wherein the unprocessed-substrate influence model creator is configured to:

perform the operation of dividing the plural number of the processed image into the first set of processed images and the second set of processed images when the number of the processed images is equal to or greater than a predetermined value; and create the unprocessed-substrate influence model without performing the operation of dividing the plural number of the processed image into the first set of processed images and the second set of processed images when the number of the processed images is less than the predetermined value.

7. A shape characteristic value estimation method of estimating a shape characteristic value relating to a shape of a target film formed on a substrate, the shape characteristic value estimation method comprising:

acquiring a processed-image including image information about a surface of a processed substrate after a process of the target film;

estimating the shape characteristic value of the target film by applying, to the processed-image, an estimation model for estimating the shape characteristic value of the target film, which is associated with a correlation between information about a color of the substrate included in the processed image and the shape characteristic value of the target film formed on the substrate;

creating an unprocessed-substrate influence model relating to a correlation between a difference between an estimation result of the shape characteristic value of the target film and a shape characteristic value of the target film obtained without using the estimation model, and information about a color of an unprocessed substrate before the process of the target film; and correcting the estimation result of the shape characteristic value of the target film based on the unprocessed-substrate influence model, wherein the creating the unprocessed-substrate influence model includes:

dividing a plural number of the processed image into a first set of processed images and a second set of processed images;

creating a first candidate for the unprocessed-substrate influence model based on the first set of processed images and creating a second candidate for the unprocessed-substrate influence model based on the second set of processed images; and determining the unprocessed-substrate influence model by comparing a result of correction of the estimation result based on the first candidate with a result of correction of the estimation result based on the second candidate.

8. The shape characteristic value estimation method of claim 7, further comprising:

dividing the plural number of the processed image into the first set of processed images, the second set of processed images and a third set of processed images; and determining the unprocessed-substrate influence model by comparing a result of correction of an estimation result relating to the third set of processed images based on the first candidate with a result of correction of the estimation result relating to the third set of processed images based on the second candidate.

9. The shape characteristic value estimation method of claim 8, further comprising:

repeating the operation of dividing the plural number of the processed image into the first set of processed images, the second set of processed images and the third set of processed images multiple times while changing a combination of the processed images included in the first set of processed images and the second set of processed images; and determining the unprocessed-substrate influence model by comparing a result of correction of the estimation result relating to the third set of processed images based on the first candidate in relation to each of the first set of processed images with a result of correction of the estimation result relating to the third set of processed images based on the second candidate in relation to each of the second set of processed images.

10. The shape characteristic value estimation method of claim 9, wherein, when the number of the processed images is equal to or greater than a predetermined value, the dividing the plural number of the processed image into the first set of processed images and the second set of processed images is performed; and when the number of the processed images is less than the predetermined value, the unprocessed-substrate influence model is created without performing the dividing the plural number of the processed image into the first set of processed images and the second set of processed images.

11. The shape characteristic value estimation method of claim 8, wherein, when the number of the processed images is equal to or greater than a predetermined value, the dividing the plural number of the processed image into the first set of processed images and the second set of processed images is performed; and when the number of the processed images is less than the predetermined value, the unprocessed-substrate influence model is created without performing the dividing the plural number of the processed image into the first set of processed images and the second set of processed images.

12. The shape characteristic value estimation method of claim 7, wherein, when the number of the processed images is equal to or greater than a predetermined value, the dividing the plural number of the processed image into the first set of processed images and the second set of processed images is performed; and when the number of the processed images is less than the predetermined value, the unprocessed-substrate influence model is created without performing the dividing the plural number of the processed image into the first set of processed images and the second set of processed images.

13. A non-transitory computer-readable storage medium storing a program that causes an apparatus to execute the shape characteristic value estimation method of claim 7.

* * * * *